United States Patent
Kadota et al.

(10) Patent No.: US 10,862,311 B2
(45) Date of Patent: Dec. 8, 2020

(54) POWER CONVERSION DEVICE AND METHOD FOR CONTROLLING POWER CONVERSION DEVICE

(71) Applicant: Hitachi, Ltd., Tokyo (JP)

(72) Inventors: Mitsuhiro Kadota, Tokyo (JP); Akihiko Kanouda, Tokyo (JP); Yasuaki Norimatsu, Tokyo (JP); Takae Shimada, Tokyo (JP)

(73) Assignee: Hitachi, Ltd., Tokyo (JP)

(*) Notice: Subject to any disclaimer, the term of this patent is extended or adjusted under 35 U.S.C. 154(b) by 52 days.

(21) Appl. No.: 16/328,959

(22) PCT Filed: Oct. 5, 2016

(86) PCT No.: PCT/JP2016/079601
§ 371 (c)(1),
(2) Date: Feb. 27, 2019

(87) PCT Pub. No.: WO2018/066087
PCT Pub. Date: Apr. 12, 2018

(65) Prior Publication Data
US 2019/0199100 A1  Jun. 27, 2019

(51) Int. Cl.
*H02J 3/38*  (2006.01)
*H02M 3/335*  (2006.01)
(Continued)

(52) U.S. Cl.
CPC ......... *H02J 3/383* (2013.01); *H02M 3/33592* (2013.01); *H02M 7/49* (2013.01);
(Continued)

(58) Field of Classification Search
CPC .. H02J 3/383; H02J 2207/20; H02M 3/33592; H02M 7/49
(Continued)

(56) References Cited

U.S. PATENT DOCUMENTS

2009/0283129 A1* 11/2009 Foss .............. H02M 7/493
  136/244
2014/0159481 A1* 6/2014 Berger .............. B60L 50/51
  307/10.1
(Continued)

FOREIGN PATENT DOCUMENTS

JP  2009-165265 A  7/2009
JP  2012-186907 A  9/2012
(Continued)

OTHER PUBLICATIONS

International Search Report (PCT/ISA/210) issued in PCT Application No. PCT/JP2016/079601 dated Dec. 13, 2016 with English translation (four (4) pages).
(Continued)

*Primary Examiner* — Michael R. Fin
(74) *Attorney, Agent, or Firm* — Crowell & Moring LLP

(57) ABSTRACT

A power conversion device includes three first power conversion cells each converting input power and outputting the converted power and having input terminals connected in parallel regarding a first power supply and three second power conversion cells each converting input power and outputting the converted power and having input terminals connected in parallel regarding a second power supply, wherein: the power output from the cell and the power output from the cell are combined to output a first phase power; the power output from the cell and the power output from the cell are combined to output a second phase power; and the power output from the cell and the power output from the cell are combined to output a third phase power. The first phase, second phase, and third phase powers are output as the phase powers or inter-line powers of a three-phase system.

7 Claims, 12 Drawing Sheets

(51) Int. Cl.
*H02M 7/49* (2007.01)
*H02M 1/00* (2006.01)
*H02M 3/337* (2006.01)
*H02M 7/5387* (2007.01)

(52) U.S. Cl.
CPC .......... *H02J 2207/20* (2020.01); *H02M 3/337* (2013.01); *H02M 3/33584* (2013.01); *H02M 7/5387* (2013.01); *H02M 2001/007* (2013.01); *H02M 2001/0058* (2013.01)

(58) Field of Classification Search
USPC .......................................................... 307/82
See application file for complete search history.

(56) References Cited

U.S. PATENT DOCUMENTS

2015/0311708 A1* 10/2015 Tao ........................ H02J 3/383
307/82
2016/0276964 A1 9/2016 Zushi et al.

FOREIGN PATENT DOCUMENTS

JP 2012-257451 A 12/2012
WO WO 2015/056571 A1 4/2015

OTHER PUBLICATIONS

Japanese-language Written Opinion (PCT/ISA/237) issued in PCT Application No. PCT/JP2016/079601 dated Dec. 13, 2016 (five (5) pages).

Zhou et al., "Real Time Digital Simulation (RTDS) of a Novel Battery-Integrated PV System for High Penetration Application", 2nd IEEE International Symposium on Power Electronics for Distributed Generation Systems, Jun. 18, 2010, pp. 786-790, (five (5) pages).

* cited by examiner

FIG. 4A
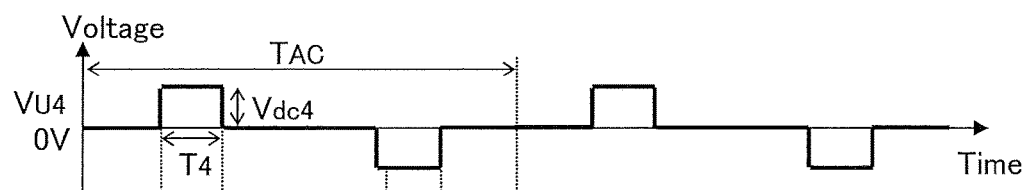
FIG. 4B
FIG. 4C
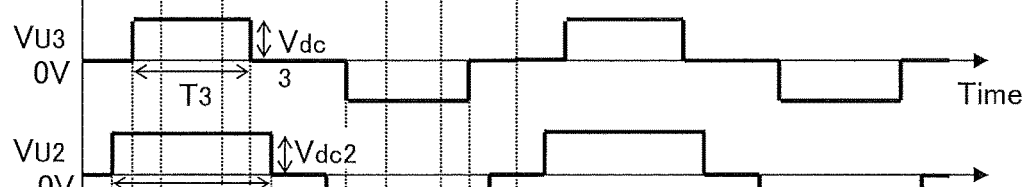
FIG. 4D
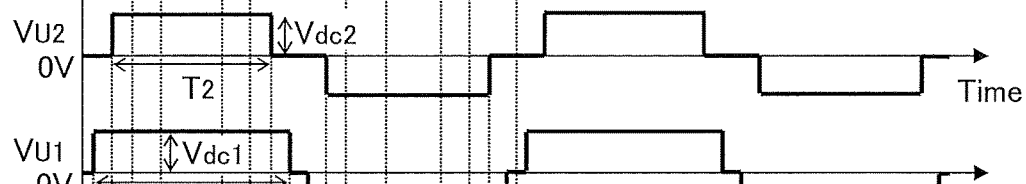
FIG. 4E
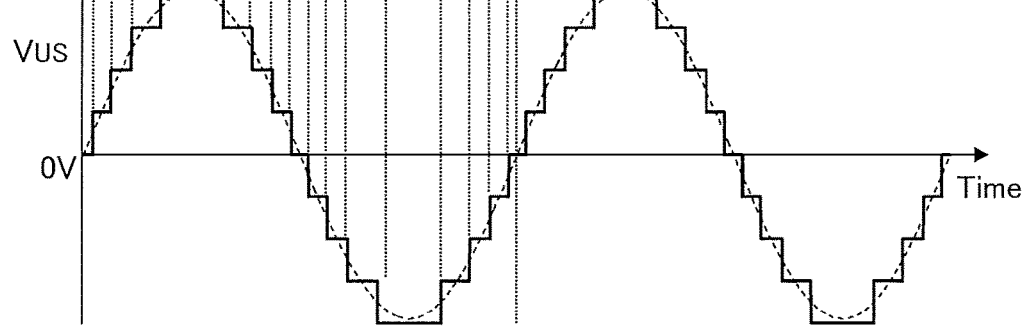

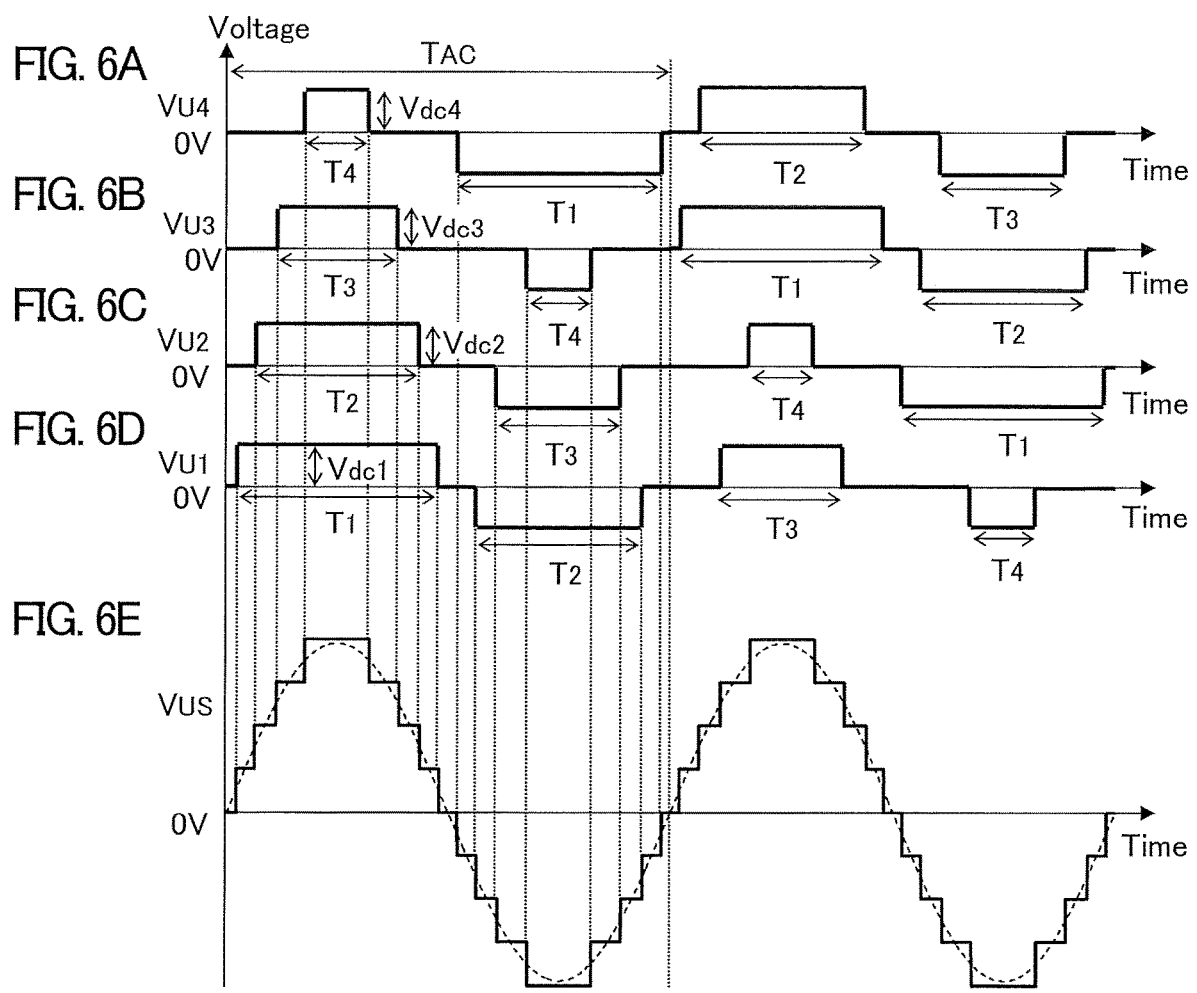

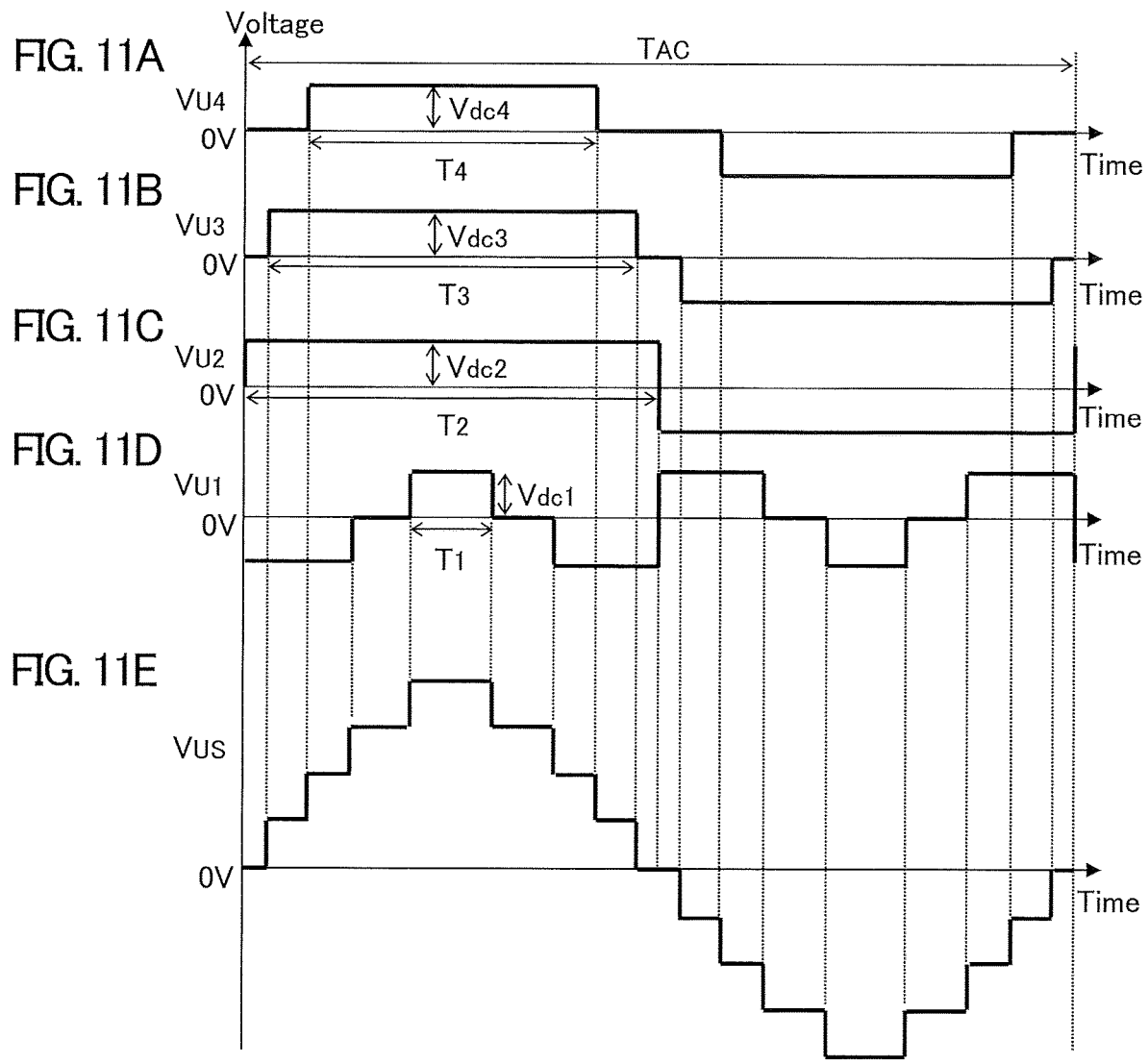

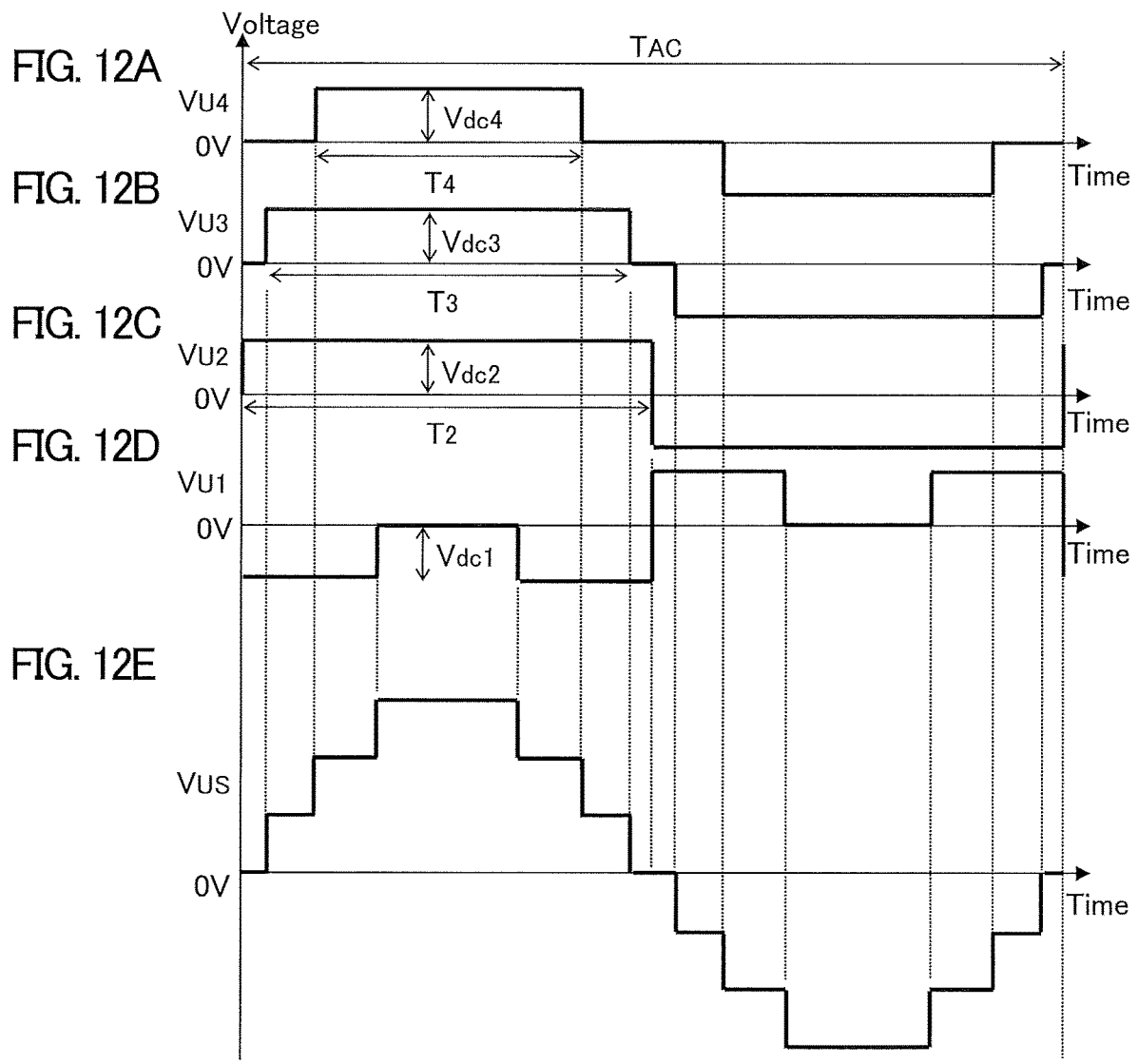

POWER CONVERSION DEVICE AND METHOD FOR CONTROLLING POWER CONVERSION DEVICE

TECHNICAL FIELD

The present invention relates to a power conversion device and a method for controlling the power conversion device.

BACKGROUND ART

For high-voltage or large-capacity power conversion is used a power conversion device in which a plurality of power conversion cells (hereinafter, simply referred to as cells) are connected in series or in parallel. For instance, to drive a high-voltage motor, widely used is a system (called, for example, a multi-winding inverter system) in which output terminals of a plurality of inverters (a kind of electric power converter) are connected in series and the output voltages of the inverters are combined to output a high voltage. In addition, natural energy power generation such as photovoltaic power generation and wind power generation has been increasingly introduced world-wide. PCS (power conditioning system) has been known as a power conversion device for converting natural energy-derived electric power and outputting the converted electric power to a power system. Even in this PCS, it seems to be effective to use a plurality of cells when the voltage thereof becomes high and/or the capacity thereof becomes large accordingly as described above.

As an example, PATENT DOCUMENT 1 below disclosed "Provided is a solar power conversion apparatus which includes at least one solar array receiving light and generating a DC power, a converter unit converting amplitude of the generated DC power, a multilevel inverter unit receiving the DC power from the converter unit to output AC power with multi levels and comprising a plurality of multilevel inverters, an AC filter insulating the multilevel inverter unit from a system, and a control unit applying a control signal to the converter unit and the multilevel inverter unit" (see the Abstract). PATENT DOCUMENT 1 describes a configuration where outputs of two multilevel inverters are serially connected. The output combined through the serial connection is coupled via a filter and a transformer to a power system. Note that input parts of the multilevel inverters are each coupled via a converter to an individual solar array.

PRIOR ART

Patent Document

PATENT DOCUMENT 1: JP2012-257451A

SUMMARY OF INVENTION

Technical Problem

In large-capacity power generation systems, PCS outputs are often coupled to a three-phase AC power system. Here, it is conceivable that three PCSs each equipped with a plurality of cells as described above are used and the PCS outputs are connected to three-phase lines to output three-phase AC powers. Unfortunately, in such a configuration, one or more phase-providing PCSs may have a decreased power generation capability. For instance, photovoltaic power generation systems may encounter a situation where a shadow is casted on only some of solar cells and the shadowed solar cells have a decreased power generation amount. Generally speaking, it is required to supply a three-phase AC power system with electric powers in equilibrium. When one or more phase-providing PCSs have a decreased power generation capability, the other phase-providing PCSs should also have decreased output power. Unfortunately, this power generation system cannot be operated efficiently.

The present invention has been made in view of the above-mentioned situations. The purpose of the invention is to provide a power conversion device which can be operated highly efficiently and a method for controlling the power conversion device.

Solution to Problem

To solve the above problem, an aspect of the present invention provides a power conversion device comprising:

three first power conversion cells each converting input power and outputting the converted power and having input terminals connected in parallel with respect to a first power supply; and three second power conversion cells each converting input power and outputting the converted power and having input terminals connected in parallel with respect to a second power supply., wherein the power output from one of the first power conversion cells and the power output from one of the second power conversion cells are combined to output a first phase power;

the power output from another of the first power conversion cells and the power output from another of the second power conversion cells are combined to output a second phase power;

the power output from the other of the first power conversion cells and the power output from the other of the second power conversion cells are combined to output a third phase power; and the first phase, second phase, and third phase powers are output as phase powers or line powers of a three-phase system.

Advantageous Effect(s) of Invention

The present invention makes it possible to realize a power conversion device which can be operated highly efficiently and a method for controlling the power conversion device.

BRIEF DESCRIPTION OF DRAWINGS

FIGS. 4A to 4E are diagrams illustrating output voltage waveforms of the cells and an output voltage waveform of the phase converter according to the first embodiment.

FIGS. 6A to 6E are diagrams illustrating output voltage waveforms of cells and an output voltage waveform of a phase converter according to a second embodiment.

FIGS. 11A to 11E are diagrams illustrating output voltage waveforms of cells in a low charge mode and an output voltage waveform of a phase converter according to the fifth embodiment.

FIGS. 12A to 12E are diagrams illustrating output voltage waveforms of the cells in a high charge mode and an output voltage waveform of the phase converter according to the fifth embodiment.

DESCRIPTION OF EMBODIMENTS

First Embodiment

<How First Embodiment is Configured>

In the first embodiment, a power conversion device is applied to a photovoltaic power generation system.

Figure 1:
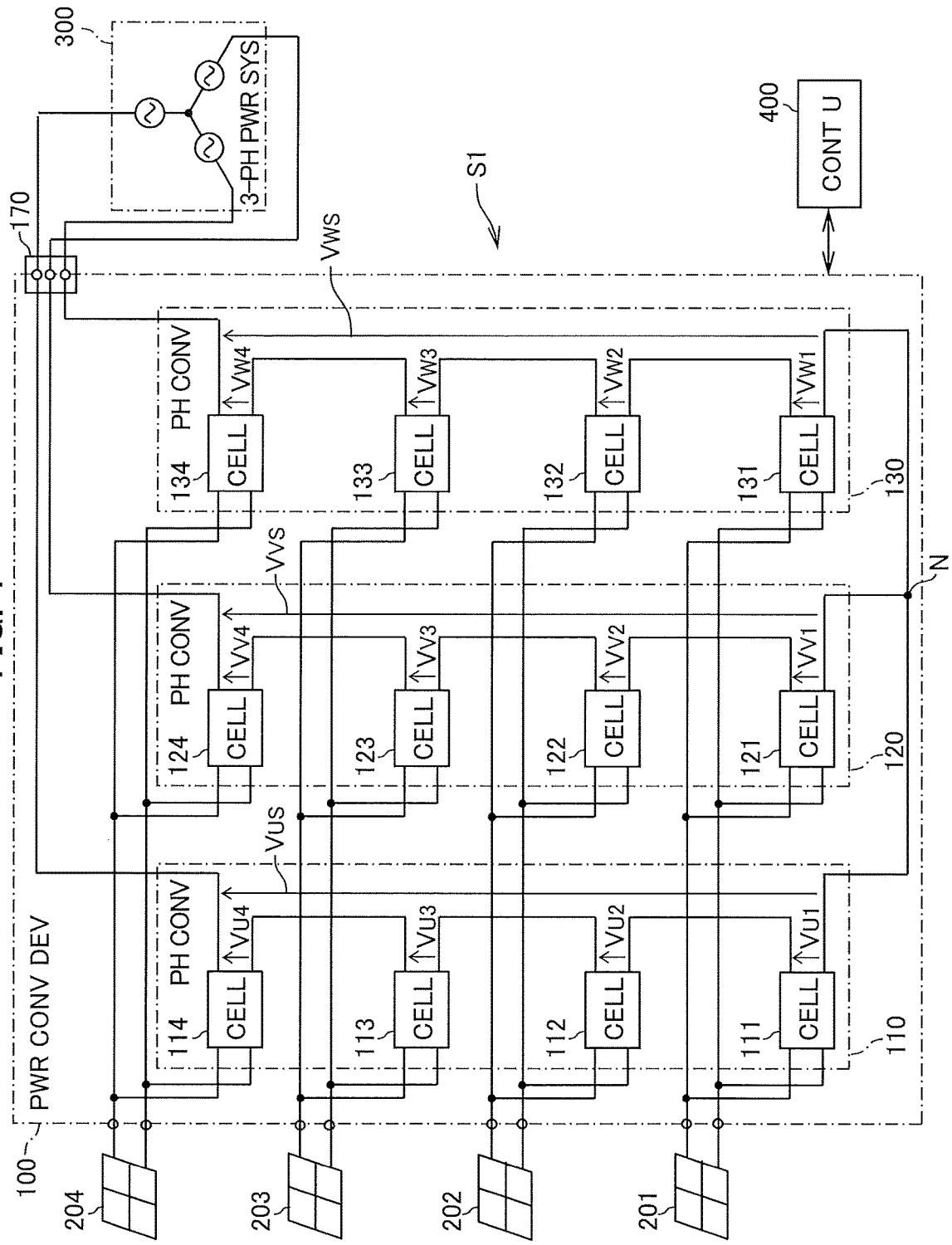
FIG. 1 is a block diagram showing a photovoltaic power generation system according to a first embodiment of the present invention.

FIG. 1 is a block diagram showing a photovoltaic power generation system S1 according to the first embodiment of the present invention.

The photovoltaic power generation system S1 includes a power conversion device 100, a control unit 400 configured to control the power conversion device 100, and four solar cells 201, 202, 203, and 204 as power supplies.

The power conversion device 100 converts powers input from the solar cells 201 to 204 to output three-phase AC powers to a three-phase power system 300. Note that between the power conversion device 100 and the three-phase power system 300 may be connected to a filter(s) (not shown) and/or a transformer(s) (not shown).

The solar cell 201 may be one solar cell panel or a plurality of solar cell panels connected in series or in parallel. The same applies to the solar cells 202 to 204.

A protective part(s) such as backflow-preventing diode or a fuse and/or a converter(s) such as a chopper circuit, which are not shown, may be inserted in series between each of the solar cells 201 to 204 and the power conversion device 100.

The power conversion device 100 is provided with phase converters 110, 120, and 130, each generating output power of each phase in the three-phase AC powers. The phase converters 110, 120, and 130 generate a U-phase output voltage $V_{US}$, a V-phase output voltage $V_{VS}$, or a W-phase output voltage $V_{WS}$, respectively. Each phase converter 110, 120, or 130 has a pair of output terminals. One of the output terminals serves as a three-phase output terminal 170 and is connected to the three-phase power system 300. By contrast, the other output terminal is connected to those of the other phase converters to constitute a neutral point N.

The phase converters 110, 120, and 130 each include a plurality of power conversion cells (hereinafter, referred to as cells), the output terminals of which are connected in series. Specifically, the phase converter 110 is provided with four cells 111, 112, 113, and 114, the output terminals of which are connected in series. The output voltages of the cells 111, 112, 113, and 114 are designated as $V_{U1}$, $V_{U2}$, $V_{U3}$, and $V_{U4}$, respectively. Likewise, the phase converter 120 has four serially connected cells 121, 122, 123, and 124, and the output voltages thereof are designated as $V_{V1}$, $V_{V2}$, $V_{V3}$, and $V_{V4}$, respectively. Likewise, the phase converter 130 has four serially connected cells 131, 132, 133, and 134, and the output voltages thereof are designated as $V_{W1}$, $V_{W2}$, $V_{W3}$, and $V_{W4}$, respectively.

The U-phase output voltage $V_{US}$ is a voltage obtained by combining the output voltages $V_{U1}$, $V_{U2}$, $V_{U3}$, and $V_{U4}$. The V-phase output voltage $V_{VS}$ is a voltage obtained by combining the output voltages $V_{V1}$, $V_{V2}$, $V_{V3}$, and $V_{V4}$. The W-phase output voltage $V_{WS}$ is a voltage obtained by combining the output voltages $V_{W1}$, $V_{W2}$, $V_{W3}$, and $V_{W4}$. Note that FIG. 1 shows the configuration where the phase converters 110, 120, and 130 are each provided with four cells; but the number of the cells may be set arbitrarily.

Respective input terminals of cells 111 121, and 131 of the phase converters 110, 120, and 130, respectively, are connected in parallel with respect to the solar cell 201. Likewise, input terminals of cells 112, 122, and 132 are connected in parallel with respect to the solar cell 202; input terminals of cells 113, 123, and 133 are connected in parallel with respect to the solar cell 203; and input terminals of cells 114, 124, and 134 are connected in parallel with respect to the solar cell 204.

As such, the solar cells 201 to 204 are each connected to one of cells in each of the phase converters 110, 120, and 130. In other words, any of the solar cells 201 to 204 fails to be connected to only cells of a specific phase converter.

The power conversion device 100 may include, in addition to the above-described components, part(s) such as a protective part(s) (e.g., a relay, a fuse, an arrester) and/or a filter part(s) (e.g., a reactor, a capacitor).

The control unit 400 includes general computer hardware such as a CPU (central processing unit), a RAM (random access memory), and a ROM (read only memory). The ROM stores, for example, a control program executed by the CPU and various data. The respective functions of the control unit 400 as described below can be executed by the control program, etc.

When the respective phase output voltages $V_{US}$, $V_{VS}$, and $V_{WS}$ output from the power conversion device 100 are controlled, the cells 111 to 134 of the respective phase converters 110, 120, and 130 are preferably controlled in a coordinated manner. Here, the control unit 400 executes such coordinated control. Meanwhile, PSC for photovoltaic power generation generally controls currents output to the three-phase power system 300. Then, the control unit 400 executes a feedback control calculation such that after the output currents of the power conversion device 100 are detected, each current is set to a desired value. This calculation is conducted to give target values for the respective phase output voltages $V_{US}$, $V_{VS}$, and $V_{WS}$.

Figure 2:
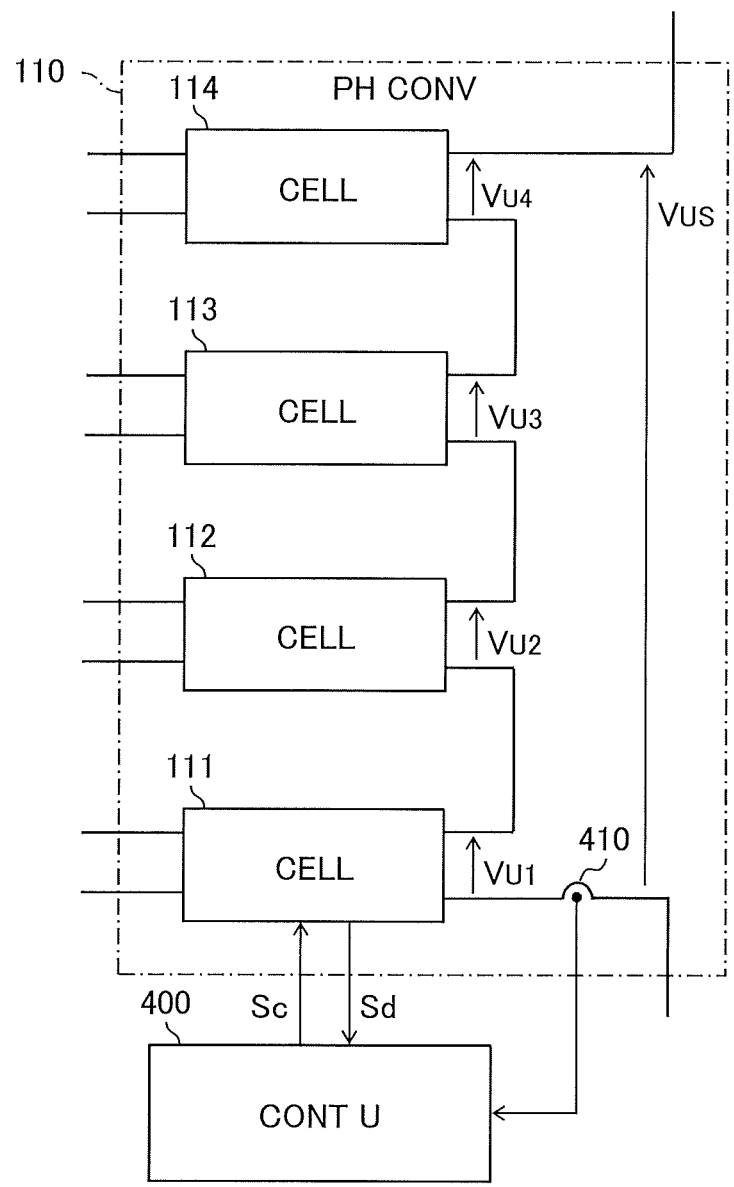
FIG. 2 is a detailed block diagram illustrating a phase converter according to the first embodiment.

FIG. 2 is a detailed block diagram illustrating the phase converter 110.

As shown, the phase converter 110 has a current detector 410.

The current detector 410 detects a U-phase output current of the phase converter 110 and send the results to the control unit 400. The control unit 400 executes the above-described feedback control calculation based on the detection results of this U-phase output current. In addition, to control output voltages $V_{U1}$ to $V_{U4}$ of the cells 111 to 114 and the U-phase output voltage $V_{US}$ of the phase converter 110, the control unit 400 outputs a control signal Sc to the cells 111 to 114 of the phase converter 110. In addition, the cells 111 to 114 each output, to the control unit 400, a detection signal Sd indicating the physical variables (e.g., a voltage, current, temperature) of each cell and their status regarding the presence or absence of an abnormality.

Provided that to avoid making the figure complicated in FIG. 2, only signals input and output between the control unit 400 and the cell 111 are depicted. In reality, the signals are likewise input and output between the control unit 400 and each of the cells 112 to 114. In addition, the signal denoted as an arrow in FIG. 2 may include a plurality of pieces of information.

Further, all the parts of the control unit 400 are not necessarily mounted on one substrate. A substrate having components of the respective cells 111 to 114 may be provided with some parts of the control unit 400.

Hereinabove, the phase converter 110 has been described in detail. The phase converters 120 and 130 (see FIG. 1) also each have substantially the same current detectors (not shown) as the current detectors 410. In addition, the control unit 400 controls, like the phase converter 110, the phase converters 120 and 130.

Figure 3:
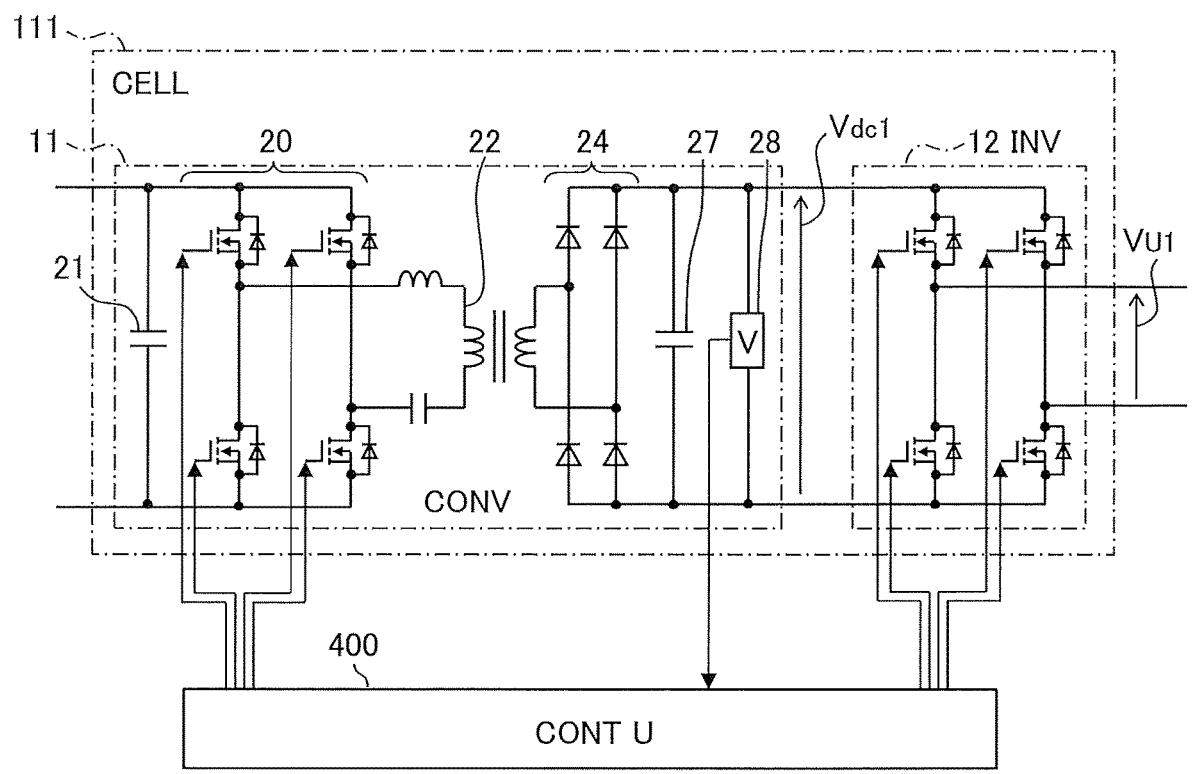
FIG. 3 is a diagram illustrating a circuit of cells according to the first embodiment.

FIG. 3 is an example of a circuit diagram of the cell 111.

The cell 111 has a converter 11 and an inverter 12. The converter 11 converts a DC current input into the cell 111 to generate a DC link voltage $V_{dc1}$. Likewise, the cells 112 to 114 (see FIG. 2) are each provided with the converter to generate DC link voltages $V_{dc2}$ to $V_{dc4}$ (not shown), respectively.

FIG. 3 shows an example in which a resonance converter, a kind of insulated DC-DC converter, is employed as a specific circuit system for the converter 11. The resonance converter is an insulated DC-DC converter suitable for making the system compact and highly efficient and has been used in a wide range of fields from industrial to consumer use. The resonance converter itself has been well-known and the detailed description is thus omitted. The converter 11 is provided with an inverter 20, a transformer 22, and a rectifier circuit 24.

The inverter 20 has four switching elements (MOSFETs in the example of FIG. 3), which are switched on and off to generate an AC voltage. The generated AC voltage is converted to a DC link voltage $V_{dc1}$ by using the transformer 22 and the rectifier circuit 24. The control unit 400 controls the inverter 20 and others so as to set the DC link voltage $V_{dc1}$ to a predetermined value. The capacitors 21 and 27 suppress a voltage fluctuation at input□output terminals of the converter 11. Note that as long as the DC link voltage can be generated, another system may be employed as the specific circuit system for the converter.

The inverter 12 converts the DC link voltage $V_{dc1}$ to generate an output voltage $V_{U1}$ of the cell 111. Likewise, the cells 112 to 114 (see FIG. 2) are each provided with the converter, and the DC link voltages $V_{dc2}$ to $V_{d4}$ (not shown) are converted to generate output voltages $V_{U2}$ to $V_{U4}$, respectively. FIG. 3 shows an example in which an H-bridge single-phase inverter is employed as a specific circuit system for the inverter 12.

The H-bridge single-phase inverter has been well-known, and the detailed description is thus omitted. The inverter 12 has four switching elements (MOSFETs in the example of FIG. 3), which are switched on and off to control the output voltage $V_{U1}$ (instantaneous value) to be either $+V_{dc1}$, 0, or $-V_{dc1}$. That is, the inverter 12 outputs the DC link voltage $V_{dc1}$ as it is, sets the output voltage to approximately zero, or inverts the polarity of the DC link voltage $V_{dc1}$ and outputs the resulting voltage. Note that another system may be employed as the specific circuit system for the inverter.

In FIG. 3, the converter 11 is provided with a voltage detector (V) 28 for detecting the DC link voltage $V_{dc1}$. The DC link voltage $V_{dc1}$ detected by the voltage detector 28 is output to the control unit 400. The detection value of the DC link voltage $V_{dc1}$ is included in the detection signal Sd described in FIG. 2. The control unit 400 executes feedback control based on the detection value of the DC link voltage $V_{dc1}$ so as to set this DC link voltage to be close to a predetermined target value.

Note that the converter 11 may be provided with, in addition to the voltage detector 28, a current detector and/or a temperature detector. In addition, the inverter 12 may be likewise provided with a voltage detector, a current detector, and/or a temperature detector. The cell 111 may include, in addition to the above-described components, part(s) such as a protective part(s) (e.g., a relay, a fuse, an arrester) and/or a filter part(s) (e.g., a reactor, a capacitor). Each cell included in the phase converters 120 and 130 may have substantially the same configuration.

Hereinabove, the configuration of the cell 111 has been described and the same configuration of the cell 111 applies to those of the other cells 112 to 134. According to this embodiment, each cell is electrically insulated between the input and the output thereof. Accordingly, as described above, a plurality of phase converters are connected in parallel with respect to each solar cell. Meanwhile, in FIG. 1, the negative electrode sides of the respective solar cells 201 and 204 may be in contact with the ground.

<How First Embodiment Works>

The following describes how this embodiment works.

FIGS. 4A to 4E are diagrams illustrating output voltage ($V_{U1}$ to $V_{U4}$) waveforms of the cells 111 to 114 and a U-phase output voltage $V_{US}$ waveform of the phase converter 110 according to this embodiment.

In FIGS. 4A to 4E, two cycles of a waveform of an AC voltage output from the power conversion device 100 are shown. The cycle of the AC voltage is designated as $T_{AC}$. The doted sine wave, on which the U-phase output voltage $V_{US}$ waveform is superimposed, of FIG. 4E is a fundamental wave component included in the U-phase output voltage $V_{US}$. This fundamental wave component may be considered to be a target value for the U-phase output voltage $V_{US}$.

As described above, the cell 111 can output the output voltage $V_{U1}$ instantaneous value such that the voltage is set to either $+V_{dc1}$, 0, or $-V_{dc1}$. Then, the control unit 400 makes the cell 111 output the output voltage $V_{U1}$ such that the amplitude is $V_{dc1}$, the pulse width is $T_1$, and the polarity is switched to be positive or negative every half cycle $T_{AC}/2$ as described in FIG. 4D.

In addition, the control unit 400 likewise makes the cell 112 (see FIG. 2) output the output voltage $V_{U2}$ such that the amplitude is $V_{dc2}$, the pulse width is $T_2$, and the polarity is switched to be positive or negative every half cycle $T_{AC}/2$. In addition, the control unit 400 likewise makes the cell 113 (see FIG. 2) output the output voltage $V_{U3}$ such that the amplitude is $V_{dc3}$, the pulse width is $T_3$, and the polarity is switched to be positive or negative every half cycle $T_{AC}/2$. In addition, the control unit 400 likewise makes the cell 114 (see FIG. 2) output the output voltage $V_{U4}$ such that the amplitude is $V_{dc4}$, the pulse width is $T_4$, and the polarity is switched to be positive or negative every half cycle $T_{AC}/2$.

Note that the pulse widths $T_1$ to $T_4$ and the DC link voltages $V_{dc1}$ to $V_{dc4}$ as shown in FIGS. 4A to 4D may be constant values or may be finely adjusted. The U-phase output voltage $V_{US}$ is a voltage obtained by combining the output voltages $V_{U1}$ to $V_{U4}$. Accordingly, the U-phase output voltage $V_{US}$ has a waveform like a sine wave as shown in FIG. 4E. Here, provided that the power generation amounts $P_{m1}$, $P_{m2}$, $P_{m3}$, and $P_{m4}$ of the solar cells 201, 202, 203, and 204, respectively, have a relationship of "$P_{m1}>P_{m2}>P_{m3}>P_{m4}$". Thus, the pulse widths $T_1$ and $T_4$ has a given relationship of "$T_1>T_2>T_3>T_4$".

Here, provided that the DC link voltages $V_{dc1}$ to $V_{dc4}$ of the respective cells 111 to 114 are substantially the same and the power factor of the phase converter 110 output is approximately 1. In this case, if the output powers of the cells 111 to 114 are designated as $P_{111}$, $P_{112}$, $P_{113}$, and $P_{114}$, these values have a relationship of "$P_{111}>P_{112}>P_{113}>P_{114}$". As such, the power magnitude relationship is the same between each solar cell and the corresponding cell, which are connected to each other. Note that $V_{dc1}$ to $V_{dc4}$ and $T_1$ to $T_4$ may be controlled to adjust the output powers of the cells 111 to 114, respectively. Accordingly, it is possible to make the power generation amount of each solar cell agree with the power output from the corresponding cell.

Figure 5A:
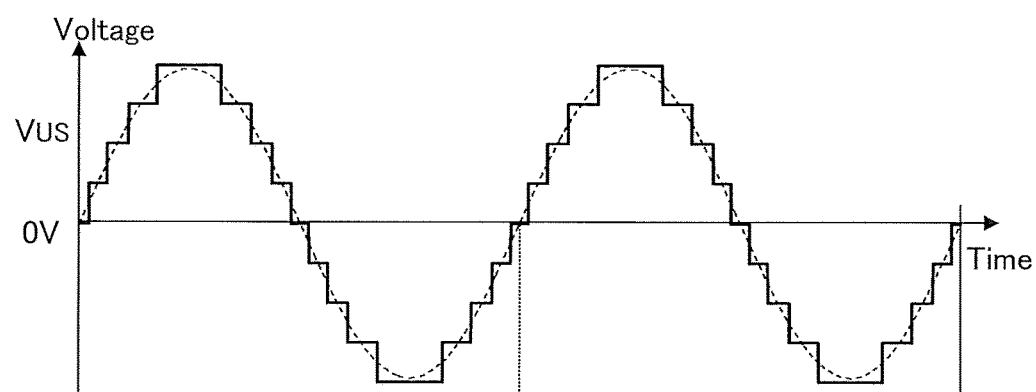
FIGS. 5A to 5C are diagrams showing the output voltage waveform of each phase converter according to the first embodiment.
Figure 5B:
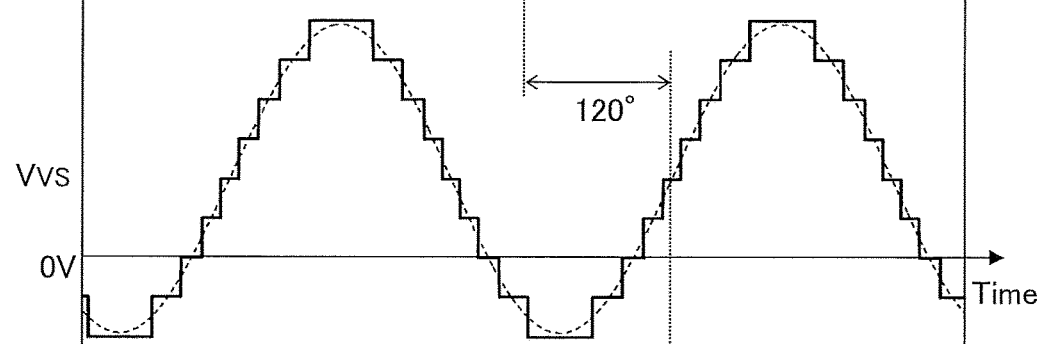
Figure 5C:
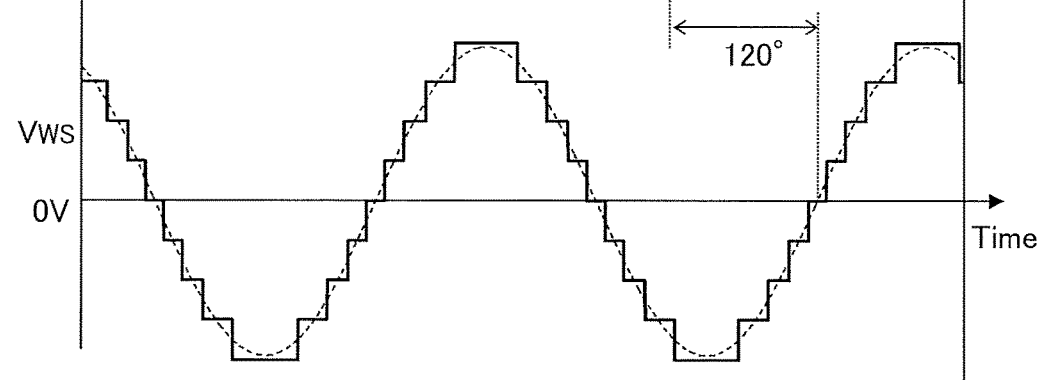

FIGS. 5A to 5C are diagrams showing the output voltage ($V_{US}$, $V_{VS}$, and $V_{WS}$) waveforms of the respective phase converters 110, 120, and 130. The phase of the V-phase output voltage $V_{VS}$ has a delay by 120 degrees and the phase of the W-phase output voltage $V_{WS}$ has a delay by 240 degrees with respect to the U-phase output voltage $V_{US}$. The shapes of these waveforms are identical, and it should be understood that the output voltages $V_{US}$, $V_{VS}$, and $V_{WS}$ can constitute three-phase AC voltages.

Here, examined is operation when a partial shadow, etc., causes a decrease in the power generation amount $P_{m1}$ of the solar cell 201. When the power generation amount $P_{m1}$ of the solar cell 201 is decreased, the output powers of the cells 111, 121, and 131, which are connected to the solar cell 201, decrease. Accordingly, the output powers of the phase converters 110, 120, and 130 of the respective phases decrease. However, amounts of decrease in the output powers of the phase converters 110, 120, and 130 are equal, so that the three-phase equilibrium state is kept in balance. In addition, it is unnecessary to decease the powers extracted from the solar cells 202 to 204. Even if the maximum power amount that can be extracted from each solar cell is extracted, the three-phase equilibrium state can be maintained.

<Advantageous Effects of First Embodiment>

As described above, even if any of power supplies has a decreased output power, the three-phase equilibrium state can be maintained without decreasing the output power(s) of the other power supply(s).

In this embodiment, the first power supply (201) and the second power supply (202) are, in particular, solar cells. There is a tendency where a partial shadow, etc., is likely to cause the output power to decrease. Even in such a case, the photovoltaic power generation system S1 can be operated highly efficiently.

Second Embodiment

The following describes a photovoltaic power generation system according to the second embodiment of the present invention.

The hardware configuration of this embodiment is the same as of the first embodiment (see FIGS. 1 and 3). Provided that in this embodiment, the solar cells 201 to 204 have substantially the same power generation amounts $P_{m1}$ to $P_{m4}$.

FIGS. 6A to 6E are diagrams illustrating output voltage ($V_{U1}$ to $V_{U4}$) waveforms of the cells 111 to 114 and a U-phase output voltage $V_{US}$ waveform of the phase converter 110 according to this embodiment.

Regarding the output voltage $V_{U1}$ illustrated in FIG. 6D, the pulse widths are set every half cycle in the order of $T_1$, $T_2$, $T_3$, and $T_4$ in rotation. That is, the pulse widths are circularly changed. The phases of the output voltages $V_{U2}$, $V_{U3}$, and $V_{U4}$ of the cells 112, 113, and 114 are advanced by half a cycle, one cycle, and one and a half cycles, respectively, with respect to that of the output voltage $V_{U1}$. Like the case of the output voltage $V_{U1}$, the pulse widths are set every half cycle in the order of $T_1$, $T_2$, $T_3$, and $T_4$ in rotation. This makes all the cells each have the same output power average over two cycles of the AC output.

If the electrostatic capacities of the capacitors 21 and 27 shown in FIG. 3 are large enough, the powers input into the cells 111 to 114 from the solar cells 201 to 204 are all equal and are kept constant over time.

In addition, in this embodiment, some incidents may cause a decrease in the power generation amount(s) of one or more of the solar cells 201 to 204. Even in this case, the output powers of the cells 111 to 114 may be adjusted by modifying the rotation pattern. Accordingly, it is possible to make the power generation amount of each solar cell agree with the power output from the corresponding cell. For instance, the power generation amounts of the cells 111 and 112 may be kept at a normal level, but the power generation amounts of the cells 113 and 114 may be decreased for some reason. In this case, it may be an option that the pulse widths $T_1$ and $T_2$ are alternately used for the output voltages $V_{U1}$ and $V_{U2}$ of the cells 111 and 112; and the pulse widths $T_3$ and $T_4$ are alternately used for the output voltages $V_{U3}$ and $V_{U4}$ of the cells 113 and 114.

As described above, according to this embodiment, even if any of power supplies has a decreased output power, the three-phase equilibrium state can be maintained like the first embodiment without decreasing the output power(s) of the other power supply(s). Hence, the photovoltaic power generation system can be operated highly efficiently.

Further, according to this embodiment, the respective solar cells may have different power generation amounts; or the respective solar cells may have substantially the same power generation amount. In either case, it is possible to make the power generation amount of each solar cell agree with the power output from the corresponding cell by modifying the waveform pattern of the output voltages ($V_{U1}$ to $V_{U4}$) of the cells 111 to 114.

Third Embodiment

Figure 7:
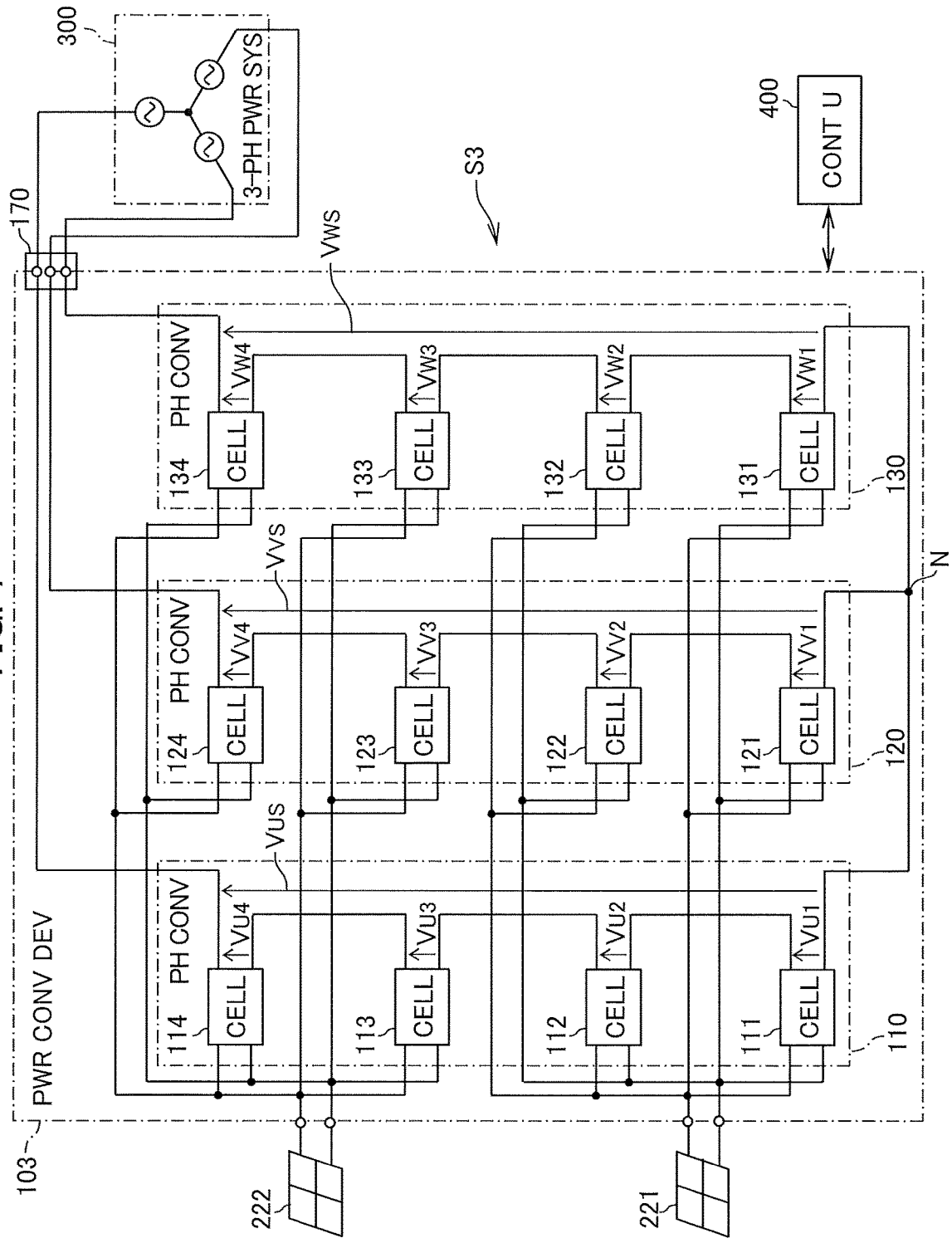
FIG. 7 is a block diagram showing a photovoltaic power generation system according to a third embodiment.

FIG. 7 is a block diagram showing a photovoltaic power generation system S3 according to the third embodiment of the present invention. Note that in FIG. 7, elements corresponding to the respective elements of FIGS. 1 to 5 have the same reference numerals so as to avoid redundancy.

In this embodiment, a power conversion device 103 shown in FIG. 7 is used instead of the power conversion device 100 according to the first embodiment (see FIG. 1). In this embodiment, two solar cells 221 and 222 are used as the first and second power supplies and these solar cells 221 and 222 have approximately the same power generation amount.

Respective input terminals of six first power conversion cells, namely cells 111 and 112 of the phase converter 110, and cells 121 and 122 of the phase converter 120, and cells 131 and 132 of the phase converter 130 are connected in parallel with respect to the solar cell 221.

In addition, respective input terminals of six second power conversion cells, namely cells 113 and 114 of the phase converter 110, and cells 123 and 124 of the phase converter 120, and cells 133 and 134 of the phase converter 130 are connected in parallel with respect to the solar cell 222.

As such, a plurality of cells included in one phase converter may be connected in parallel with respect to one solar cell. When the rated power of one cell is smaller than the power generation amount of one solar cell, the configuration of this embodiment is particularly effective.

As described above, according to this embodiment, even if any of power supplies has a decreased output power, the three-phase equilibrium state can be maintained like the first and second embodiments without decreasing the output power(s) of the other power supply(s). Hence, the photovoltaic power generation system can be operated highly efficiently.

Further, according to this embodiment, the number of the first phase-providing first power conversion cells (111, 112) is equal to the number of the first phase-providing second power conversion cells (113, 114); the number of the second phase-providing first power conversion cells (121, 122) is equal to the number of the second phase-providing second power conversion cells (123, 124); and the number of the third phase-providing first power conversion cells (131, 132) is equal to the number of the third phase-providing second power conversion cells (133, 134).

Thus, this embodiment is particularly useful when the respective power supplies (221 and 222) have almost the same power generation amount.

Fourth Embodiment

Figure 8:
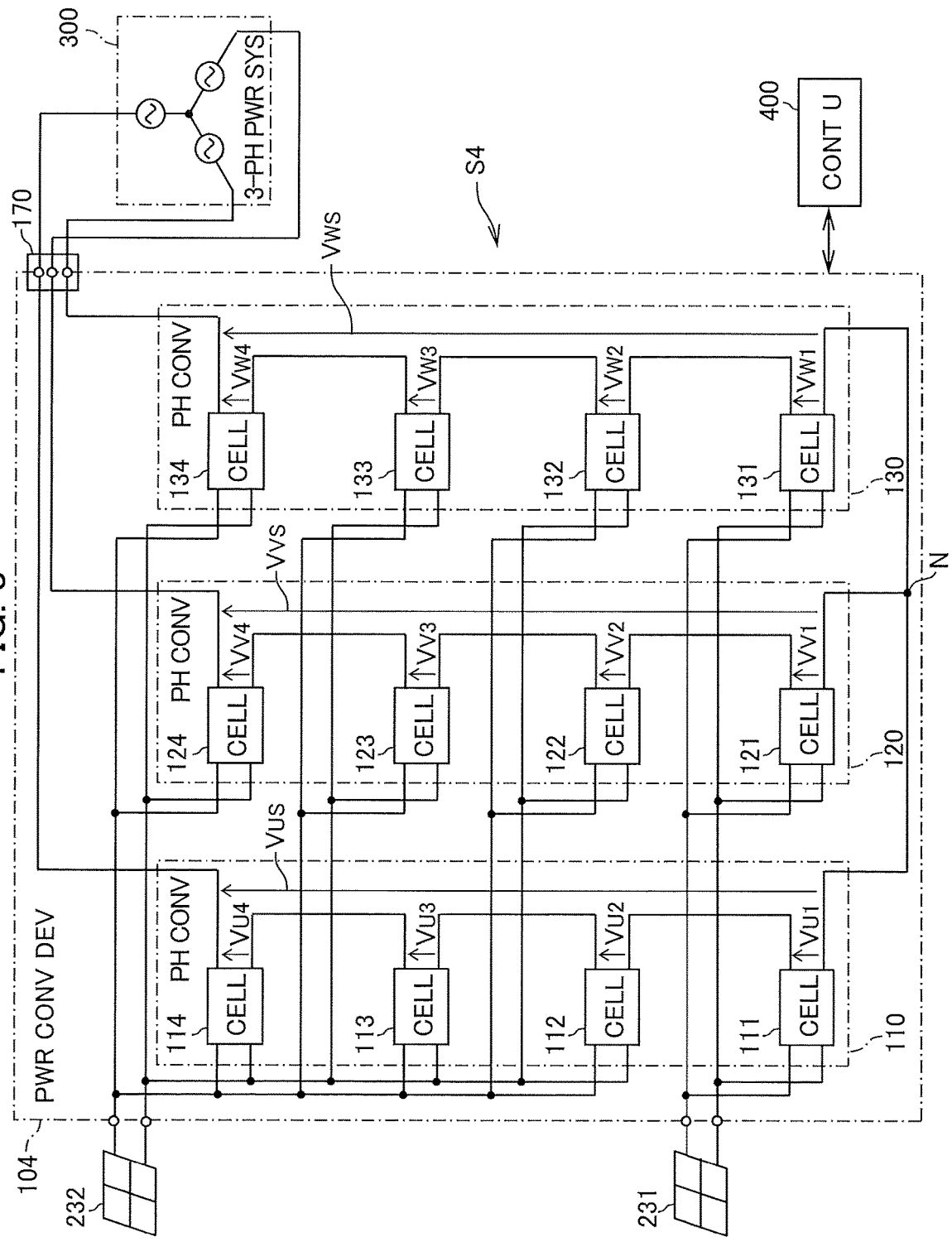
FIG. 8 is a block diagram showing a photovoltaic power generation system according to a fourth embodiment.

FIG. 8 is a block diagram showing a photovoltaic power generation system S4 according to the fourth embodiment of the present invention. Note that in FIG. 8, elements corresponding to the respective elements of FIGS. 1 to 7 have the same reference numerals so as to avoid redundancy.

In this embodiment, a power conversion device 104 shown in FIG. 8 is used instead of the power conversion device 100 according to the first embodiment (see FIG. 1). In this embodiment, two solar cells 231 and 232 are used as the first and second power supplies and the power generation amount of the solar cell 232 is larger than the power generation amount of the solar cell 231.

Respective input terminals of three first power conversion cells, namely a cell 111 of the phase converter 110, and a cell 121 of the phase converter 120, and a cell 131 of the phase converter 130 are connected in parallel with respect to the solar cell 231.

In addition, respective input terminals of nine second power conversion cells, namely cells 112, 113, and 114 of the phase converter 110, and cells 122, 123, and 124 of the phase converter 120, and cells 132, 133, and 134 of the phase converter 130 are connected in parallel with respect to the solar cell 232.

As described above, according to this embodiment, even if any of power supplies has a decreased output power, the three-phase equilibrium state can be maintained like the first to third embodiments without decreasing the output power(s) of the other power supply(s). Hence, the photovoltaic power generation system can be operated highly efficiently.

Further, according to this embodiment, the number of the first phase-providing first power conversion cells (111) is smaller than the number of the first phase-providing second power conversion cells (112, 113, 114); the number of the second phase-providing first power conversion cells (121) is smaller than the number of the second phase-providing second power conversion cells (122, 123, 124); and the number of the third phase-providing first power conversion cells (131) is smaller than the number of the third phase-providing second power conversion cells (132, 133, 134).

Thus, this embodiment is particularly useful when the power generation amount of the first power supply (231) is smaller than the power generation amount of the second power supply (232).

Fifth Embodiment

<How Fifth Embodiment is Configured>

Figure 9:
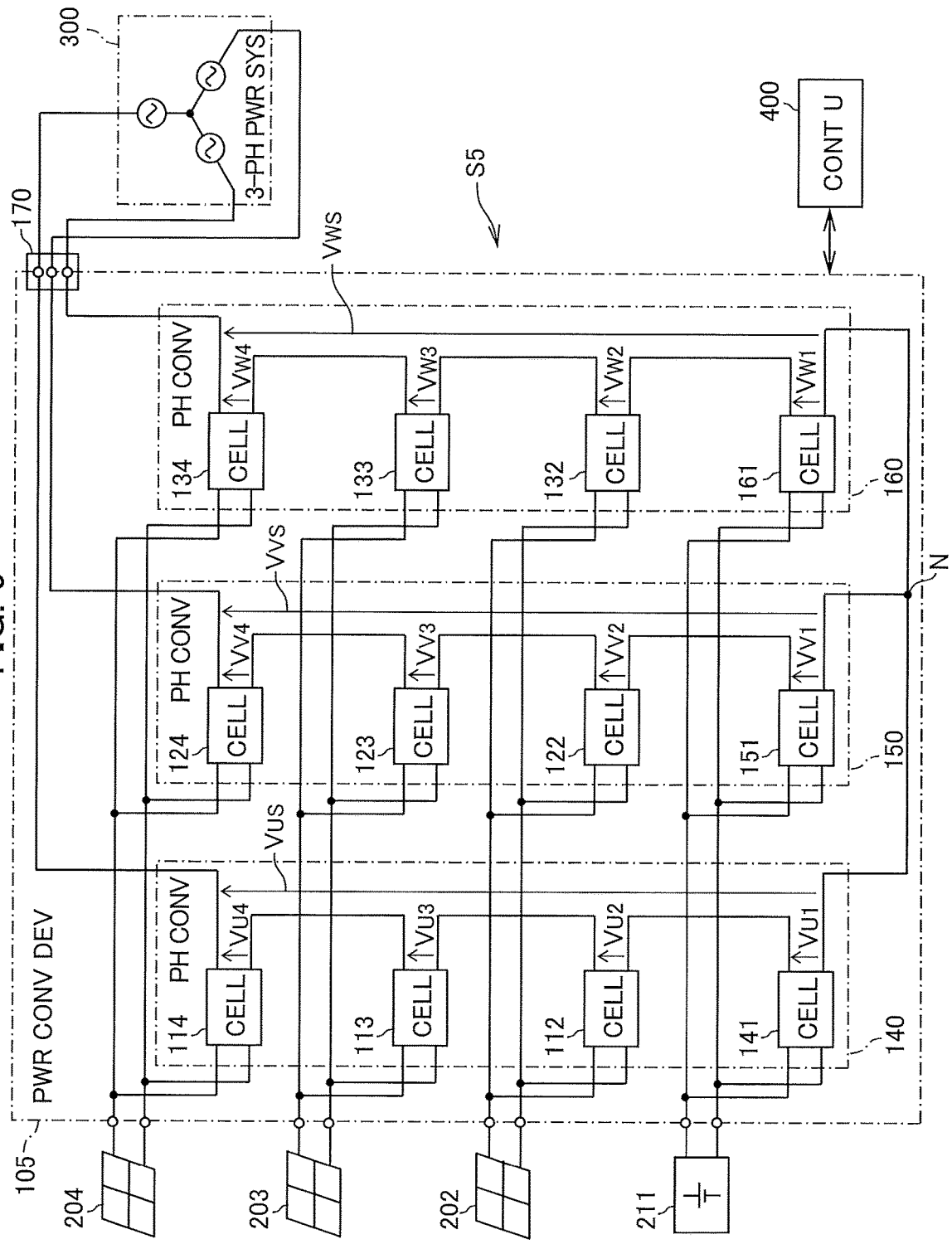
FIG. 9 is a block diagram showing a photovoltaic power generation system according to a fifth embodiment.

FIG. 9 is a block diagram showing a photovoltaic power generation system S5 according to the fifth embodiment of the present invention.

Note that in FIG. 9, elements corresponding to the respective elements of FIGS. 1 to 8 have the same reference numerals so as to avoid redundancy.

In this embodiment, a power conversion device 105 shown in FIG. 9 is used instead of the power conversion device 100 according to the first embodiment (see FIG. 1). In this embodiment, a battery 211 is used as the first power supply and solar cells 202 to 204 are used as the second power supplies.

The power conversion device 105 is provided with phase converters 140, 150, and 160, each generating output power of each phase in the three-phase AC powers. The phase converters 140, 150, and 160 generate a U-phase output voltage $V_{US}$, a V-phase output voltage $V_{VS}$, and a W-phase output voltage $V_{WS}$, respectively. The phase converters 140, 150, and 160 each include a plurality of cells, the output terminals of which are connected in series. Specifically, the phase converter 140 has four serially connected cells 141 and 112 to 114, the output terminals of which are connected in series. The output voltages of the cells 141 and 112 to 114 are designated as $V_{U1}$, $V_{U2}$, $V_{U3}$, and $V_{U4}$, respectively.

Likewise, the phase converter 150 has four serially connected cells 151, 122, 123, and 124, and the output voltages thereof are designated as $V_{V1}$, $V_{V2}$, $V_{V3}$, and $V_{V4}$, respectively. Likewise, the phase converter 160 has four serially connected cells 161, 132, 133, and 134, and the output voltages thereof are designated as $V_{W1}$, $V_{W2}$, $V_{W3}$, and $V_{W4}$, respectively. The U-phase output voltage $V_{US}$ is a voltage obtained by combining the output voltages $V_{U1}$, $V_{U2}$, $V_{U3}$, and $V_{U4}$. The V-phase output voltage $V_{VS}$ is a voltage obtained by combining the output voltages $V_{V1}$, $V_{V2}$, $V_{V3}$, and $V_{V4}$. The W-phase output voltage $V_{WS}$ is a voltage obtained by combining the output voltages $V_{W1}$, $V_{W2}$, $V_{W3}$, and $V_{W4}$.

Respective input terminals of the cell 141 of the phase converter 140, the cell 151 of the phase converter 150, and the cell 161 of the phase converter 160 are connected in parallel with respect to the battery 211. Here, the cells 141, 151, and 161 may convert electric power to and from the battery 211 in both a charging direction and a discharging direction. In addition, input terminals of cells 112, 122, and 132 are connected in parallel with respect to the solar cell 202; input terminals of cells 113, 123, and 133 are connected in parallel with respect to the solar cell 203; and input terminals of cells 114, 124, and 134 are connected in parallel with respect to the solar cell 204.

Figure 10:
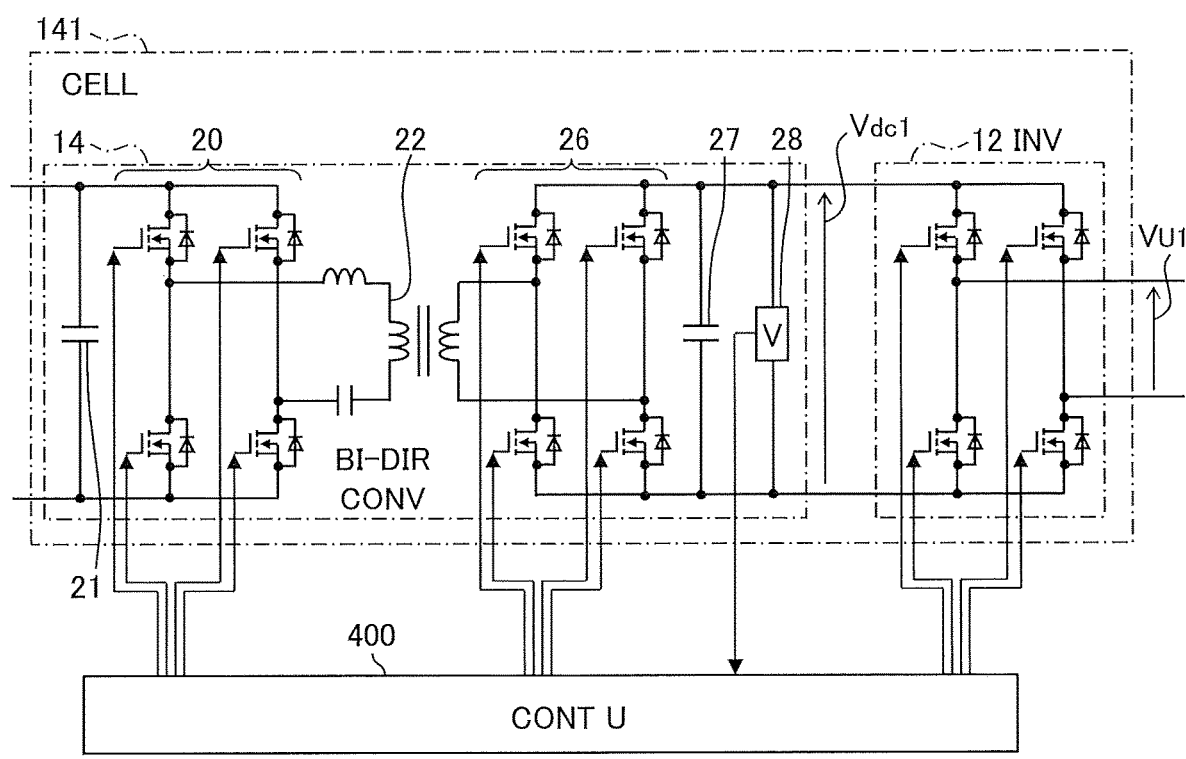
FIG. 10 is a diagram showing a circuit of a cell that can convert electric power in both directions.

FIG. 10 is a diagram showing a circuit of a cell 141 that can convert electric power in the both directions.

The cell 141 has a bidirectional converter 14 and an inverter 12. Here, the configuration of the inverter 12 is same as of the cell 111 (see FIG. 3) according to the first embodiment. Meanwhile, in the bidirectional converter 14, the rectifier circuit 24 included in the converter 11 (see FIG.

3) is replaced by a bridge circuit 26. Here, the bridge circuit 26 is an H-bridge using four switching elements (MOSFET in the example of FIG. 10).

If the battery 211 (see FIG. 9) is under discharge, the control unit 400 makes the bridge circuit 26 function as a rectifier circuit. This enables the bidirectional converter 14 to serve like the converter 11 of the first embodiment. If the battery 211 is under charge, the control unit 400 makes the inverter 20 function as a rectifier circuit and the bridge circuit 26 function as an inverter.

<How Fifth Embodiment Works>
(Discharge Mode of Battery 211)

The following describes how this embodiment works.

In this embodiment, the control unit 400 is configured to be able to appropriately set the operation mode (a discharge mode, a low charge mode, or a high charge mode) of the cell 141. Depending on the operation mode, the cells 141 and 112 to 114 are controlled.

First, the discharge mode, in which the battery 211 is under discharge, is explained. The control unit 400 controls the output voltages $V_{U1}$ to $V_{U4}$ of the cells 141 and 112 to 114 in a manner similar to those of the second embodiment (see FIGS. 4A to 4D). Accordingly, the battery 211 is not charged and the power output from the battery 211 is continuously converted and supplied to the three-phase power system 300.

(Low Charge Mode of Battery 211)

The modes for operating the cell 141 so as to charge the battery 211 include a low charge mode, in which the amount of charge is relatively small, and a high charge mode, in which the amount of charge is relatively large.

FIGS. 11A to 11E are diagrams illustrating output voltage ($V_{U1}$ to $V_{U4}$) waveforms of the cells 141 and 112 to 114 and a U-phase output voltage $V_{US}$ waveform of the phase converter 140 according to the low charge mode.

In FIGS. 11A to 11D, one cycle ($T_{AC}$) of a waveform of an AC voltage output from the power conversion device 100 is shown. In FIGS. 11A to 11E are diagrams, there are periods where the polarity of the U-phase output voltage $V_{US}$ and the polarity of the cell 141 output voltage $V_{U1}$ are the same and periods where they are different. The periods where the polarities are different therebetween are charging periods. For instance, periods where the U-phase output voltage $V_{US}$ has a positive polarity and the output voltage $V_{U1}$ has a negative polarity are the 16 charging periods.

If the power factor is approximately 1, the cell 141 is operated such that the power is regenerated during the charging periods. Specifically, the bidirectional converter 14 shown in FIG. 10 is used to transfer electric power from the output side (power system side) to the input side (battery side) so as to charge the battery 211. In order to produce a U-phase output voltage $V_{US}$ waveform like the one shown in the first embodiment (see FIG. 4E) during such an operation, the pulse widths $T_2$ to $T_4$ of the output voltages $V_{U2}$ to $V_{U4}$ in FIGS. 11A to 11C are made longer than those of FIGS. 4A to 4C. As such, the control unit 400 can make the battery 211 charged by using the power generation amounts of the solar cells 202 to 204 while the AC powers are output by the phase converters 110.

(High Charge Mode of Battery 211)

FIGS. 12A to 12E are diagrams illustrating output voltage ($V_{U1}$ to $V_{U4}$) waveforms of the cells 141 and 112 to 114 and a U-phase output voltage $V_{US}$ waveform of the phase converter 140 according to the high charge mode.

In the embodiment of FIG. 12E, the number of steps of the U-phase output voltage $V_{US}$ is 3. Provided that the DC link voltages $V_{dc2}$ to $V_{dc4}$ are made higher than those of the embodiment of FIGS. 11A to 11D, even if the number of steps is 3, the U-phase output voltage $V_{US}$ has substantially the same amplitude as of the embodiment of FIG. 11E. In the embodiment of FIGS. 12A to 12E, there are no periods where the polarity of the voltage output from the phase converter 140 and the polarity of the output voltage $V_{U1}$ output from the cell 141 are the same. That is, during the high charge mode, no periods where the battery 211 is under discharge are present. Hence, the amount of charge into the battery 211 can be made larger than that of the low charge mode.

<Advantageous Effects of Fifth Embodiment>

As described above, according to the photovoltaic power generation system S5 of this embodiment, the first power supply (211) is a battery; the second power supply (202) is a solar cell; and the first power conversion cells (141, 151, and 161) are configured to be able to convert electric power in both a charging direction and a discharging direction with respect to the battery.

This enables stable power generation to continue by appropriately charging and discharging the battery 211 even in the photovoltaic power generation system S5, in which the power generation amount fluctuates from hour to hour.

Modification Embodiments

The present invention is not limited to the above embodiments, and various modifications are allowed. The above-described embodiments are just examples so as to explain the present invention in an understandable manner. Thus, the present invention is not necessarily limited to embodiments including all the elements described. In addition, part of the configuration of a certain embodiment may be replaced by the configuration of another embodiment. Further, the configuration of a certain embodiment may be added to the configuration of another embodiment. Furthermore, any part of the configuration of each embodiment may be deleted or may be added to or replaced by another configuration. Meanwhile, control lines and/or information lines shown in the drawings indicate what is considered to be necessary for description, so that they may not represent all the control lines and/or information lines required for the products. In fact, almost all the configurations may be connected to one another. Examples of a possible modification regarding the above embodiments include the following.

(1) In the above embodiments, a solar cell or battery is used as an example of the "power supply" in the description. However, the "power supply" is not limited to the above. Examples may include various power supplies such as a wind power generator, a current power generator, and a primary battery. In addition, the "power supply" is not limited to a DC power supply and may be an AC power supply.

(2) In the above embodiments, the output voltages of the phase converters 110, 120, and 130 (or 140, 150, and 160) are provided as phase voltages and the phase converters are connected to the three-phase power system 300. However, these output voltages of the phase converters may be provided as line voltages and the phase converters may be connected to the three-phase power system 300. In addition, in the above embodiments, the outputs of the power conversion device are connected to the three-phase power system, but may be connected to, in addition to the above system, a load (e.g., a three-phase motor) that can be driven by the three-phase AC powers.

(3) in the above second embodiment, the rotation pattern of the output voltages $V_{U1}$ to $V_{U4}$ is not limited to the one shown in FIGS. 4A to 4D and may be modified in various manners.

For instance, when the "$T_1+T_4$" and the "$T_2+T_3$" are equal, it may be possible that the pulse widths $T_1$ and $T_4$ of the output voltages $V_{U1}$ and $V_{U2}$ are alternately selected and the pulse widths $T_2$ and $T_3$ of the output voltages $V_{U3}$ and $V_{U4}$ are alternately selected.

In addition, in the embodiment of FIGS. 4A to 4D, the pulse widths $T_1$ to $T_4$ are switched every half cycle of the U-phase output voltage $V_{US}$. However, the pulse widths (half the pulse width of each of $T_1$ to $T_4$ as shown in FIGS. 4A to 4D) may be switched every quarter cycle.

(4) Regarding hardware of the control unit 400 according to each embodiment, programs and others that make it possible to realize the functions of the control unit 400 by using common computers may be stored in storage media or may be distributed through a transfer path.

(5) In the above embodiments, it has been explained that the functions of the control unit 400 may be realized by software processing using programs. However, part or all of them may be replaced by hardware processing using, for example, ASIC (Application Specific Integrated Circuit; IC for a specific purpose) or FPGA (field-programmable gate array).

100 to 105 Power conversion device
111, 121, 131 Power conversion cell (First power conversion cell)
112, 122, 132 Power conversion cell (Second power conversion cell)
141, 151, 161 Power conversion cell (First power conversion cell)
201, 231 Solar cell (First power supply)
202, 232 Solar cell (Second power supply)
211 Battery (First power supply)
S1 to S5 Photovoltaic power generation system

The invention claimed is:

1. A power conversion device comprising:
three first power conversion cells each converting input power and outputting the converted power and having input terminals connected in parallel with respect to a first power supply; and
three second power conversion cells each converting input power and outputting the converted power and having input terminals connected in parallel with respect to a second power supply,
wherein the power output from one of the first power conversion cells and the power output from one of the second power conversion cells are combined to output a first phase power;
the power output from another of the first power conversion cells and the power output from another of the second power conversion cells are combined to output a second phase power;
the power output from the other of the first power conversion cells and the power output from the other of the second power conversion cells are combined to output a third phase power; and
the first phase, second phase, and third phase powers are output as phase powers or line powers of a three-phase system;
wherein a number of the first power conversion cells related to the first phase power out of the first power conversion cells is two or more and is equal to a number of the second power conversion cells related to the first phase power out of the second power conversion cells;
a number of the first power conversion cells related to the second phase power is two or more and is equal to a number of the second power conversion cells related to the second phase power out of the second power conversion cells; and
a number of the first power conversion cells related to the third phase power is two or more and is equal to a number of the second power conversion cells related to the third phase power out of the second power conversion cells.

2. A power conversion device comprising:
three first power conversion cells each converting input power and outputting the converted power and having input terminals connected in parallel with respect to a first power supply; and
three second power conversion cells each converting input power and outputting the converted power and having input terminals connected in parallel with respect to a second power supply,
wherein the power output from one of the first power conversion cells and the power output from one of the second power conversion cells are combined to output a first phase power;
the power output from another of the first power conversion cells and the power output from another of the second power conversion cells are combined to output a second phase power;
the power output from the other of the first power conversion cells and the power output from the other of the second power conversion cells are combined to output a third phase power; and
the first phase, second phase, and third phase powers are output as phase powers or line powers of a three-phase system;
wherein the number of the first power conversion cells related to the first phase power out of the first power conversion cells is smaller than the number of the second power conversion cells related to the first phase power out of the second power conversion cells;
the number of the first power conversion cells related to the second phase power is smaller than the number of the second power conversion cells related to the second phase power out of the second power conversion cells; and
the number of the first power conversion cells related to the third phase power is smaller than the number of the second power conversion cells related to the third phase power out of the second power conversion cells.

3. The power conversion device according to claim 1, wherein the first power supply and the second power supply are solar cells.

4. The power conversion device according to claim 1, wherein the first power supply is a battery and the second power supply is a solar cell; and
the first power conversion cells can convert electric power in both a charging direction and a discharging direction with respect to the battery.

5. The power conversion device according to claim 1, wherein the first power conversion cells and the second power conversion cells each output a rectangular-wave pulse and a pulse width of the rectangular-wave pulse is cyclical.

6. A power conversion device comprising:
a first power supply;
a second power supply;

three first power conversion cells each converting input power and outputting the converted power and having input terminals connected in parallel with respect to the first power supply; and three second power conversion cells each converting input power and outputting the converted power and having input terminals connected in parallel with respect to the second power supply, wherein the power output from one of the first power conversion cells and the power output from one of the second power conversion cells are combined to output a first phase power;

the power output from another of the first power conversion cells and the power output from another of the second power conversion cells are combined to output a second phase power;

the power output from the other of the first power conversion cells and the power output from the other of the second power conversion cells are combined to output a third phase power; and the first phase, second phase, and third phase powers are output as phase powers or line powers of a three-phase system, wherein a number of the first power conversion cells related to the first phase power out of the first power conversion cells is two or more and is equal to a number of the second power conversion cells related to the first phase power out of the second power conversion cells;

a number of the first power conversion cells related to the second phase power is two or more and is equal to a number of the second power conversion cells related to the second phase power out of the second power conversion cells; and a number of the first power conversion cells related to the third phase power is two or more and is equal to a number of the second power conversion cells related to the third phase power out of the second power conversion cells.

7. A method for controlling a power conversion device including three first power conversion cells each converting input power and outputting the converted power and having input terminals connected in parallel with respect to a first power supply and three second power conversion cells each converting input power and outputting the converted power and having input terminals connected in parallel with respect to a second power supply, the method comprising:

outputting a first phase power by combining the power output from one of the first power conversion cells and the power output from one of the second power conversion cells;

outputting a second phase power by combining the power output from another of the first power conversion cells and the power output from another of the second power conversion cells;

outputting a third phase power by combining the power output from the other of the first power conversion cells and the power output from the other of the second power conversion cells; and outputting the first phase, second phase, and third phase powers as phase powers or line powers of a three-phase system;

wherein a number of the first power conversion cells related to the first phase power out of the first power conversion cells is two or more and is equal to a number of the second power conversion cells related to the first phase power out of the second power conversion cells;

a number of the first power conversion cells related to the second phase power is two or more and is equal to a number of the second power conversion cells related to the second phase power oat of the second power conversion cells; and a number of the first power conversion cells related to the third phase power is two or more and is equal to a number of the second power conversion cells related to the third phase power out of the second power conversion cells.

* * * * *